United States Patent
Mueck

(10) Patent No.: US 9,184,588 B2
(45) Date of Patent: Nov. 10, 2015

(54) ISOLATED MEASUREMENT SYSTEM WITH POWER TRANSMITTER DISABLING

(71) Applicant: Michael Mueck, Andover, MA (US)

(72) Inventor: Michael Mueck, Andover, MA (US)

(73) Assignee: ANALOG DEVICES, INC., Norwood, MA (US)

( * ) Notice: Subject to any disclaimer, the term of this patent is extended or adjusted under 35 U.S.C. 154(b) by 400 days.

(21) Appl. No.: 13/670,315

(22) Filed: Nov. 6, 2012

(65) Prior Publication Data
US 2013/0278077 A1 Oct. 24, 2013

Related U.S. Application Data

(60) Provisional application No. 61/636,797, filed on Apr. 23, 2012.

(51) Int. Cl.
*H02J 1/02* (2006.01)
*G06F 1/26* (2006.01)
*H04Q 9/00* (2006.01)

(52) U.S. Cl.
CPC .. *H02J 1/02* (2013.01); *H04Q 9/00* (2013.01); *G06F 1/26* (2013.01); *H04Q 2209/883* (2013.01)

(58) Field of Classification Search
CPC ....... H02J 1/02; H04Q 9/00; H04Q 2209/883; G11B 20/22; G06F 1/26
See application file for complete search history.

(56) References Cited

U.S. PATENT DOCUMENTS

| 4,845,421 | A * | 7/1989 | Howarth et al. ............. 324/688 |
|---|---|---|---|
| 5,384,808 | A | 1/1995 | Van Brunt et al. |
| 5,940,447 | A * | 8/1999 | Connell et al. ................ 375/316 |
| 6,519,339 | B1 * | 2/2003 | Sacca et al. .................... 379/412 |
| 7,075,329 | B2 | 7/2006 | Chen et al. |
| 7,515,076 | B1 * | 4/2009 | Singh et al. ................... 341/122 |
| 8,089,311 | B2 | 1/2012 | Chen |
| 2004/0080885 | A1 | 4/2004 | Gaksch et al. |
| 2004/0264941 | A1 * | 12/2004 | Hirasaka ....................... 386/115 |
| 2006/0199620 | A1 * | 9/2006 | Greene et al. ................. 455/572 |
| 2008/0267301 | A1 * | 10/2008 | Alfano et al. ................. 375/258 |
| 2009/0113222 | A1 * | 4/2009 | Lee ............................... 713/322 |
| 2009/0212759 | A1 * | 8/2009 | Melanson ................... 324/76.11 |
| 2009/0243683 | A1 | 10/2009 | Ochi et al. |
| 2010/0141282 | A1 | 6/2010 | Heath et al. |
| 2010/0246646 | A1 | 9/2010 | Gaalaas |
| 2010/0250820 | A1 | 9/2010 | Gaalaas et al. |

(Continued)

FOREIGN PATENT DOCUMENTS

| CN | 1830199 A | 9/2006 |
|---|---|---|
| CN | 101965686 A | 2/2011 |

(Continued)

*Primary Examiner* — Thomas Lee
*Assistant Examiner* — Danny Chan
(74) *Attorney, Agent, or Firm* — Kenyon & Kenyon LLP

(57) ABSTRACT

A power delivery system is disclosed for an isolated measurement system in which a power transmitter and power receiver are provided at powered and unpowered sides of an isolation barrier, respectively. The power transmitter and power receiver may be coupled by an isolator. The power transmitter may deliver power to the power receiver to power components on the unpowered side of the isolation barrier. The system may include a controller provided in the powered side to generate a clock signal defining timing of a predetermined operation of the measurement system and to generate a disabling signal to the power transmitter controller synchronously with the timing of the predetermined operation.

31 Claims, 7 Drawing Sheets

(56) References Cited

U.S. PATENT DOCUMENTS

2011/0189952 A1* 8/2011 Barrenscheen et al. ..... 455/41.1
2013/0088264 A1* 4/2013 Barrenscheen et al. ...... 327/108
2013/0294111 A1 11/2013 Persson et al.

FOREIGN PATENT DOCUMENTS

WO 2004112371 A1 12/2004
WO 2009108603 A1 9/2009

* cited by examiner

300

400

500

600

600

US 9,184,588 B2

ISOLATED MEASUREMENT SYSTEM WITH POWER TRANSMITTER DISABLING

CROSS REFERENCE TO RELATED APPLICATION

The present invention benefits from priority afforded by U.S. patent application Ser. No. 61/636,797, entitled "Isolated Measurement System," filed Apr. 23, 2012, the disclosure of which is incorporated herein in its entirety.

BACKGROUND

An isolated measurement system typically includes a measurement system to measure external signals and a control system to control the measurement system and receive measurement data therefrom. The two systems operate in two different voltage domains that are galvanically isolated from each other. The measurement system often includes multiple channels, each with its own measurement system and converter. Each channel transmits sampled data, in an asynchronous manner, to the control system through a respective data communication transformer.

A power generator provided in a voltage domain of the control system generates power for a voltage domain of the measurement system. The power generator includes a power transmitter in the control system's domain coupled to a rectifier in the measurement system's domain via a transformer that bridges an isolation barrier between the two domains. The power transmitter and rectifier are active continuously to ensure power supply to the measurement system is continuous. A power monitor may measure a voltage supply provided by the rectifier and may generate power feedback data therefrom, which is communicated to the control system's domain via a dedicated isolation transformer.

Modern applications of isolated measurement systems call for sampling and conversion operations to be performed with increasing precision. The inventors have determined that the operations of the power transmitter and/or rectifier can inject undesired electromagnetic interference into the operation of such systems. Accordingly, the inventors have identified a need for an isolated measurement system in which a powered control system may deliver power to an otherwise unpowered measurement system and yet reduce electromagnetic interference that the power delivery might inject into operations of the measurement system. The inventors also have identified a need for such a system in which communication of power feedback data makes efficient use of isolators.

DETAILED DESCRIPTION

Embodiments of the present invention provide a power delivery system for an isolated measurement system in which a power transmitter and power receiver are provided at powered and unpowered sides of an isolation barrier respectively. The power transmitter and power receiver may be coupled by a common isolator. The power transmitter may deliver power to the power receiver to power components on the unpowered side of the isolation barrier. The system may include a controller provided in the powered side to generate a clock signal defining timing of a predetermined operation of the measurement system and to generate a disabling signal to the power transmitter controller coincident with the timing of the predetermined operation.

In another embodiment, the system may include a supply monitor on the unpowered side of the isolation barrier to determine whether power supplied by the power receiver is within operating tolerances. The supply monitor may generate power control commands that may be multiplexed with data from other systems on the unpowered domain and communicated to the controller on the powered domain. The controller may alter power delivery by the power transmitter in response to the power control commands.

Figure 1:
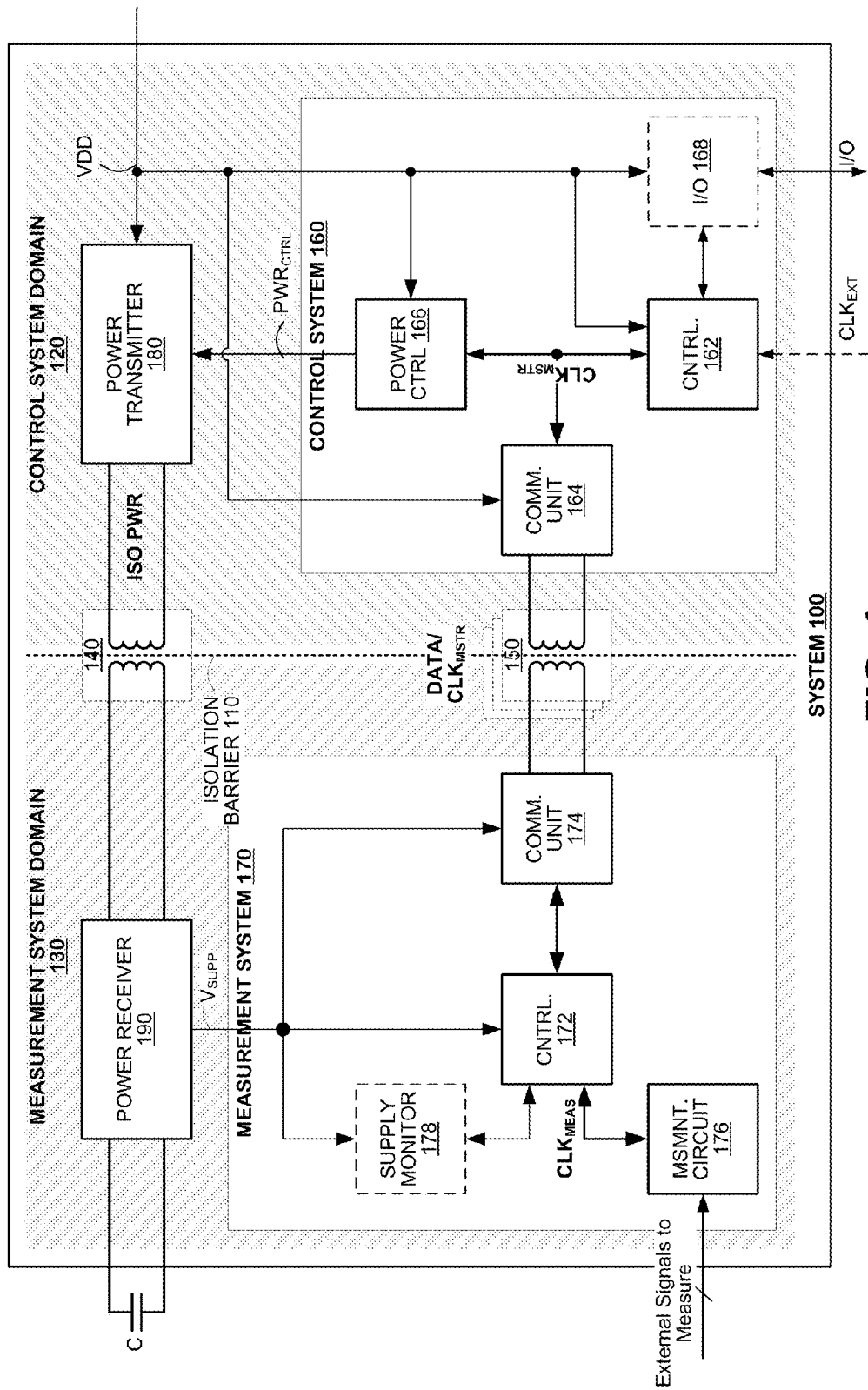
FIG. 1 illustrates a power generation system according to an embodiment of the present invention.

FIG. 1 illustrates an isolated measurement system 100 according to an embodiment of the present invention. The system 100 may define an isolation barrier 110 that establishes two galvanically isolated voltage domains 120, 130. Each voltage domain 120, 130 may have voltage supplies and ground references that are isolated from each other. The system 100 also may include various isolator devices 140, 150 to exchange power and data between the voltage domains 120, 130 while still maintaining galvanic isolation between them. In the system 100 illustrated in FIG. 1, the first voltage domain 120 may include a control system 160 to manage operations of the system 100 and, therefore, it is called a "control system domain" herein. The second voltage domain 130 may include a measurement system 170 and, therefore, it is called a "measurement system domain" herein.

The control system 160 and measurement system 170 may exchange communication with each other via communication isolators 150. The communication may include exchange of control signals, timing signals and/or data. The communication isolators 150 may be implemented as capacitors, transformers and/or opto-electric devices. A single bidirectional communication isolator 150 is shown in FIG. 1 but the system may include other communication isolators 150, which may be unidirectional and/or bidirectional, to provide higher bandwidth communication between the voltage domains 120, 130 as may be appropriate for individual application needs.

The control system domain 120 may include a power transmitter 180 and the measurement system domain 130 may include a power receiver 190. The power transmitter 180 may have outputs connected to an input side of a power isolator 140 and the power receiver 190 may have inputs connected to an output side of the same power isolator 140. The power isolator 140 may be implemented as capacitors, transformers and/or opto-electronic devices.

The power transmitter 180 may generate an oscillating output signal (ISO PWR) to the power isolator 140 in response to a control signal $PWR_{CTRL}$. In an embodiment, the power transmitter 180 may include an inductor-capacitor oscillator (not shown), which may set an operating frequency of the oscillating output signal ISO PWR. During operation, the $PWR_{CTRL}$ signal may gate operation of the power transmitter 180 which may selectively enable it to generate the output signal to the power isolator 140 or disable it from doing so. Disabling the power transmitter 180 reduces an amount of electromagnetic interference that the power transmitter 180 may inject into operation of other circuit systems, for example, the measurement system 170 of the measurement system domain 130.

FIG. 1 illustrates components of an exemplary measurement system 170, which may include a controller 172, a communication unit 174 and measurement circuit(s) 176. The controller 172 may manage operation of the measurement system 170 and may generate timing references for other components of the measurement system 170. The communication unit 174 may exchange bidirectional communication signals with the control system 160 of the control system domain 120 across communication isolator 150. The measurement circuit 176 represents circuitry to measure various external signals input to the system 100 for a test subject (not shown).

Operations of the measurement circuit 176, such as sampling of the external signals, may be high-precision operations that can be corrupted by interference generated by electrical activity of other components within the measurement system 100, including the power transmitter 180 and the power receiver 190. The measurement circuit 176 may perform its operations according to a measurement clock signal $CLK_{MEAS}$ provided by the controller 172. By way of example, the measurement circuit 176 may include one or more analog-to-digital converters ("ADCs") (not shown) to digitize externally provided voltages, each of which may be single or multi-bit ADCs (not shown). In another embodiment, the measurement circuit 176 may include one or more sigma-delta ("$\Sigma\Delta$") ADCs or multi-bit ADCs. In another embodiment, the measurement circuit 176 may include one or more capacitive sample-and-hold circuits (not shown) or other similarly situated sampling components to sample the external voltage prior to digitization.

FIG. 1 also illustrates components of an exemplary control system 160, which may include a controller 162, a communication unit 164, a power controller 166 and, optionally, an input/output ("I/O") unit 168. The controller 162 may manage operation of the control system 160 and may generate timing references for components within the control system 160. The communication unit 164 may exchange bidirectional communication signals with its counterpart communication unit 174 in the measurement system 170 via the communication isolator 150. The power controller 166 may gate operation of the power transmitter 180. The I/O unit 168 may interface with processors and/or controllers external to the system 100 (not shown) which may enable transmission of data from the measurement system 100 and/or reception of command(s) for management of the measurement system 100.

Within the control system domain 120, the control system 160 may generate timing signals to govern operation of the power transmitter 180 and the measurement system 170. The controller 162 may generate a master clock signal $CLK_{MSTR}$ from which other timing signals are derived. For example, the $CLK_{MSTR}$ signal may be communicated to the measurement system 170 via the communication units 164, 174 and a communication isolator 150, which may serve as a basis for derivation of the measurement clock signal $CLK_{MEAS}$. The controller 162 also may output the master clock signal $CLK_{MSTR}$ to the power controller 166, which may derive a power transmitter control signal $PWR_{CTRL}$ therefrom. The power transmitter control signal $PWR_{CTRL}$ may be output to the power transmitter 180 to gate its operation, selectively enabling it and disabling it at times during which high-precision events will occur in the measurement system 170.

Figure 2:
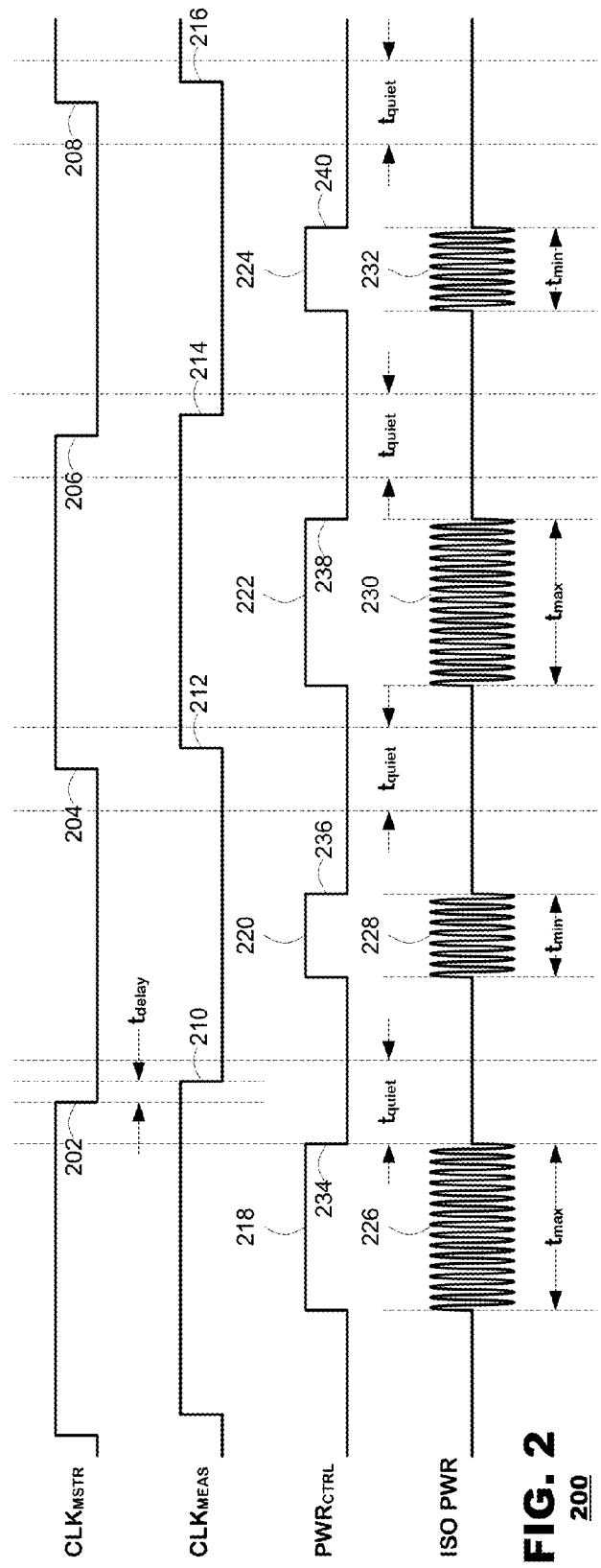
FIG. 2 illustrates a system for managing power generation according to an embodiment of the present invention.

FIG. 2 is a timing diagram 200 illustrating operation of a control system according to an embodiment of the present invention. FIG. 2 illustrates relationships among a master clock signal $CLK_{MSTR}$, a measurement clock signal $CLK_{MEAS}$, a power transmitter control signal $PWR_{CTRL}$ and a power isolator signal ISO PWR. The master clock signal $CLK_{MSTR}$ may be generated by a controller 162 within the control system domain 120 (FIG. 1). The clock measurement signal $CLK_{MEAS}$ may be derived within the measurement system domain 130 from the master clock signal $CLK_{MSTR}$. The power transmitter control signal $PWR_{CTRL}$ may be generated by the power controller 166 to the power transmitter 180 and may control timing of the power isolator signal ISO PWR.

The master clock signal $CLK_{MSTR}$ may be communicated to the measurement system 170 by the communication units 164, 174 and the isolator 150. The controller 172 within the measurement system domain 130 may derive the measurement clock signal $CLK_{MEAS}$ from the communicated $CLK_{MSTR}$ signal. Edges 202-208 within the master clock signal $CLK_{MSTR}$ may be replicated as corresponding edges 210-214 of the measurement clock signal $CLK_{MEAS}$ with a delay $t_{delay}$ imposed by the communication and derivation operations performed by intermediate circuitry 150, 164, 174. For example, the communication unit 174 may convert edges of the $CLK_{MSTR}$ signal to pulses or other transmission signals that are appropriate for transmission via a communication isolator 150 and the communication unit 164 and controller 172 may generate a recovered clock signal $CLK_{MEAS}$ from the signals received from the communication isolator 150. The measurement system 170 may perform data capture operations on rising and/or falling edges 210-214 of the measurement clock signal $CLK_{MEAS}$, which may occur at some time after corresponding edges 202-208 of the $CLK_{MSTR}$ signal. Moreover, the exact amount of delay $t_{delay}$ among the edges may vary over time due to process, voltage and/or temperature variations of the system 100. Therefore, the control system 160 within the control system domain 120 may not have information to estimate a precise time of delay between edges 202-208 and 210-214 of the $CLK_{MSTR}$ and $CLK_{MEAS}$ signals, respectively.

The power controller 166 may derive a $PWR_{CTRL}$ signal from the $CLK_{MSTR}$ signal. The $PWR_{CTRL}$ signal may include activation pulses 218-224 that are timed so as not to coincide with critical edges 202-208 within the $CLK_{MSTR}$ signal. The power transmitter 180 may generate power delivery signals 226-232 in response to activation pulses 218-224 in the $PWR_{CTRL}$ signal. In the example of FIG. 2, the $PWR_{CTRL}$ signal is illustrated as an active high signal; thus, the power transmitter 180 may generate its power delivery signals ISO PWR during times when the $PWR_{CTRL}$ signal is set at a high level.

As indicated, the activation pulses 218-224 may be timed so as not to coincide with critical edges 210-216 within the $CLK_{MEAS}$ signal. The activation pulses 218-224 may be defined to have terminating edges 234-240 that end a predetermined time before corresponding next edges 202-208 of the $CLK_{MSTR}$ signal. Terminating edges 234-240 may cause suspension of power delivery signals 226-232, which may reduce corruption that may be generated by the power transmitter 180, power isolator 140 and power receiver 190. The $PWR_{CTRL}$ signal may remain disabled for some time after the transition of the next edge 202, 204 of the $CLK_{MSTR}$ signal, whereupon a next activation pulse may initiate.

The suspension of the activation pulses 218-224 may induce windows of "quiet time" (shown as $t_{quiet}$) in operation of the power transmitter 180, power isolator 140 and power receiver 190 provided about the edges in the master clock signal $CLK_{MSTR}$. As indicated, the quiet time may reduce corruption within the system 100 by suspending operation of the power transmitter 180. The quiet time may be defined to include transitions 210-216 in the $CLK_{MEAS}$ signal based on expectations of delay induced by the communication units 164, 174 and the communication isolator 150. Transitions 210-216 in the $CLK_{MEAS}$ signal may trigger data capture operations within the system 100 and, therefore, reduced interference is expected to contribute to accuracy of such data capture operations.

FIG. 2 illustrates some of the timing variations that may be used in accordance with an embodiment of the present invention. For example, although activation pulses 218-224 are illustrated as centered within each half cycle of the master clock $CLK_{MSTR}$, other implementations are permissible. For example, pulse 218 is illustrated as aligned with an onset of the quiet window surrounding edge 202 in the master clock signal $CLK_{MSTR}$. Alternatively, an activation pulse may be aligned with the conclusion of such quiet windows. And, while it is permissible for activation pulses to fit the entire period between such windows, it may prove useful to provide activation pulses that are much smaller than the time period between such windows to provide power control in such systems 100.

In the embodiment illustrated in FIG. 2, the master clock signal $CLK_{MSTR}$ and the measurement clock signal $CLK_{MEAS}$ are illustrated as 50% duty cycle clocks having even distribution between rising and falling edges. Such clock signals often are used in a system that performs data capture on rising and falling edges of a sampling clock (in this case, $CLK_{MEAS}$). The principles of the present invention, however, may be extended to other types of clocks, for example, pulsed clocks having uneven distributions between rising and falling edges and to other types of systems, for example, systems that perform data capture on only one type of edge (e.g., a rising or a falling edge of a sampling clock). Such operational variations are immaterial to the principles of the present invention except where noted herein.

Moreover, some systems may not use all edges of a $CLK_{MSTR}$ signal or, by extension, all edges of a $CLK_{MEAS}$ signal to perform data capture operations. In such applications, it may not be necessary to introduce quiet times to the power transmitter's output ISO PWR for all edges of the master clock signal $CLK_{MSTR}$. Rather, it may be sufficient to introduce such quiet times only for those edges that will be used for data capture operations in a measurement system 170.

Returning to FIG. 1, the measurement system 170 and control system 160 may engage in a predetermined communication protocol across the communication isolator 150. The control system's master clock signal $CLK_{MSTR}$ may define timing of measurement operations to be performed by the measurement system 170 by defining the $CLK_{MEAS}$ signal. The control system 160 also may include commands or other data to be provided in conjunction with the master clock signal $CLK_{MSTR}$ that are communicated to the measurement system 170 via the communication isolator 150. The measurement system 170 may report data representing its measurements to the control system 160. In an embodiment, communication of data across the communication isolator 150 may be performed synchronously with respect to the master clock signal $CLK_{MSTR}$.

In another embodiment, the measurement system 170 may include a supply monitor 178 to measure output from the power receiver 190. The supply monitor 178 may provide power measurement data to the controller 172, which may communicate it to the control system 160 via the communication units 164, 174 and a communication isolator 150. The power measurement data may be merged with measurement data from the measurement circuit 176 as it is communicated to the control system 160. By multiplexing power control data with other data, the design eliminates a need for a dedicated isolator to manage power generation, thus the number of isolators 150 for the system 100 can be reduced.

The supply monitor 178 may generate data for the control system 160, which may include power control information to manage operation of the power transmitter 180. In an embodiment, the supply monitor 178 may include a resistor divider network and a comparator (not shown), as described in more detail below. The power control information may indicate whether the power transmitter 180 should supply more or less power to the measurement system domain 130. For example, the power control information from the supply monitor 178 may be represented by a single bit flag that is generated at periodic intervals, wherein a logic level '0' may indicate that the measurement system 170 needs less power, and a logic level '1' may indicate that the measurement system 170 needs more power.

The controller 162 may parse the power measurement data and any other measurement data from communications received by the communication unit 164 and may relay the power measurement data to the power controller 166. In an embodiment, the power measurement data may be a single bit signal indicating a need for more power or less power. The power controller 166 may modulate the $PWR_{CTRL}$ signal according to power measurement data received from the measurement system 170.

According to embodiments of the present invention, the power controller 166 may be configured to interpret an excess number of "less power" indicators to be generated as a system error, and, in turn, may control the power transmitter 180 to generate a minimum power level to ensure proper operation of the measurement system 170. Conversely, the power controller 166 may be configured to interpret repeated power feedback information indicating "more power" to be generated as another system error, and, in turn may control the power transmitter to generate a maximum power level for the measurement system 170. In an embodiment, the minimum and maximum power levels may be configured during manufacture of the isolated measurement system 100.

Embodiments of the present invention also may increase power generation reliability by providing for power generation states, which may provide a minimum power level needed to operate the measurement system 170 and a maximum power level, which the measurement system 170 may consume without damaging the system 100. For example, during start-up conditions when no power may be provided to the measurement system 170, the power regulation feedback information may be at a low logic level (e.g., which, during normal operation may indicate that the measurement system may need less power) because the supply monitor 178 is not yet powered.

In an embodiment, the power receiver 190 may include a full-wave rectifier (not shown) and a filtering capacitor C to generate the supply voltage $V_{SUPP}$ for the measurement system domain 130. Thus, the power receiver 190 may generate a supply voltage $V_{SUPP}$ that varies based on the operating frequency and operational duty rate of the power transmitter 180. In an embodiment, the filtering capacitor C may be provided as a discrete component that is external to an integrated circuit in which the power receiver 190 is fabricated. The power receiver 190, therefore, may provide for storage of power supplied by the power transmitter 180 and may maintain the power stable for periods of time even when the power transmitter 180 is disabled. For purposes of power transfer, the power isolator 140 may be provided as a transformer-based, capacitor-based or optical-based isolator. Isolated power generation and isolators are described in U.S. Pat. No. 8,089,311 and U.S. Pat. No. 7,075,329, the contents of which are incorporated herein.

Figure 3:
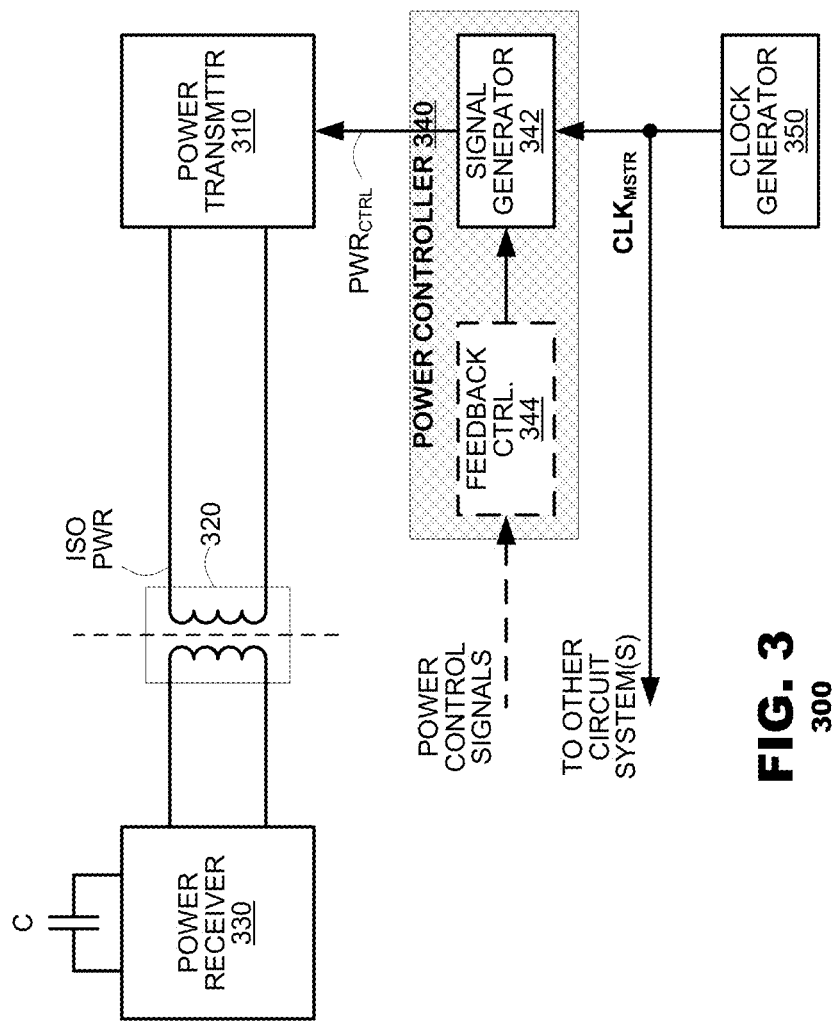
FIG. 3 is a signal diagram illustrating exemplary control signals according to an embodiment of the present invention.

FIG. 3 is a functional block diagram of a control system 300 according to an embodiment of the present invention. The control system 300 may generate a clock control signal $PWR_{CTRL}$ to a power transmitter 310, which in turn may drive signals to a power isolator 320 and to a power receiver 330. The control system 300 may include a power controller 340 and a clock generator 350. The power controller 340 may generate the $PWR_{CTRL}$ signal to the power transmitter 310 in response to a master clock signal $CLK_{MSTR}$. The clock generator 350 may generate the master clock signal $CLK_{MSTR}$ to the power controller 340.

The power controller 340 may include a signal generator 342 that generates the $PWR_{CTRL}$ signal. In a simple embodiment, the signal generator 342 may generate a pulsed signal that defines periods of activity and inactivity of the power transmitter 310. The periods of inactivity may coincide with portions of the master clock signal $CLK_{MSTR}$ that define high precision operations within the system 300.

In other embodiments, the power controller 340 may include a feedback controller 344 that interprets power control signals received from other circuit systems and provides feedback signals to the signal generator 342. For example, the feedback controller 344 may interpret power control signals received from other system sources (such as the measurement system domain 130 of FIG. 1) and determine whether such feedback signals indicate requests for increased or decreased power. The feedback controller 344 may provide data to the signal generator 342. In response, the signal generator 342 may modulate the $PWR_{CTRL}$ signal output to the power transmitter 310 to accommodate requests included in the power control signals. For example, the $PWR_{CTRL}$ signal may toggle between a predetermined number of pulse widths (shown as $t_{max}$ and $t_{min}$ in FIG. 2). Again, the power transmitter 310 may generate active output signals ISO PWR during times when the $PWR_{CTRL}$ is in an active state. Alternatively, the $PWR_{CTRL}$ signal may be a pulse-width modulated signal (not shown in FIG. 2) whose pulse width may vary within a predetermined range as determined by the power control signals. Again, the duty cycle of the power transmitter's 180 output and, therefore, an amount of power delivered to the measurement system domain 130 (FIG. 1).

As indicated, the power controller 340 may respond to power control signals that indicate a need to provide more or less power but may include functionality to determine whether an excess number of "more power" or "less power" indicators have been received. For example, the feedback controller 344 may include an accumulator (not shown) to maintain running counts of the more power or less power indicators that have been received within a predetermined period of time. The feedback controller 344 may compare the counts to predetermined thresholds representing excess numbers of "more power" or "less power" indications. If the counts were to indicate that excess "more power" or "less power" indications, the feedback controller 344 may override output signals that otherwise would be provided by the accumulator and, instead, provide a feedback signal to the signal generator 342 that maintains the power transmitter 310 in a nominal operating range.

Embodiments of the present invention also may increase power generation reliability by providing for power generation states, which may provide a minimum power level needed to operate the measurement system 170 and a maximum power level, which the measurement system 170 may consume without damaging the system 100. For example, during start-up conditions when no power may be provided to the measurement system 170, the power regulation feedback information may be at a low logic level (e.g., which, during normal operation may indicate that the measurement system 170 may need less power) because the supply monitor 178 is not yet powered. For example, during start up when the measurement system domain 130 (FIG. 1) has not yet been fully powered up, the feedback controller 344 may ignore power control commands that indicate the measurement system domain 130 needs less power. In this scenario, the system may provide a "minimum life support" power, in which an empirically determined minimum power may be sent to the measurement system domain 130. The empirically determined minimum power may be determined by experiments that may ensure the measurement system domain 130 may receive a minimum amount of power but will be functional (e.g., to generate power regulation feedback information and to send back to the non-isolated side).

In another example, if the measurement system domain 130 has been running at steady state conditions, and repeatedly indicates it needs more power (due to e.g., corruptive transmission influence), there may be a risk of providing more power than needed. In this scenario, the feedback controller 344 may monitor occurrences of such power control data and limit delivery of power to "maximum life support" power level. Thus, the feedback controller 344 may limit the power transmitter 180 (FIG. 1) to prevent providing too much power to the measurement system domain 130. The maximum power may also be determined by experiments that may ensure the measurement system domain 130 receives a maximum amount of power but will not be damaged.

The clock generator 350 may generate the master clock signal $CLK_{MSTR}$. As indicated, the master clock signal may be generated internally within the clock generator 350. In such embodiments the clock generator 350 may include a ring oscillator or other self-contained clock generator circuit. Alternatively, the master clock signal $CLK_{MSTR}$ may be derived from an externally-provided clock signal (not shown in FIG. 3), in which case the clock generator 350 may be provided as a phase lock loop, a delay lock loop or other appropriate clock generator. In a first embodiment, the clock generator 350 may output the $CLK_{MSTR}$ signal to the power controller 340 and other circuit systems without alteration.

Figure 4:
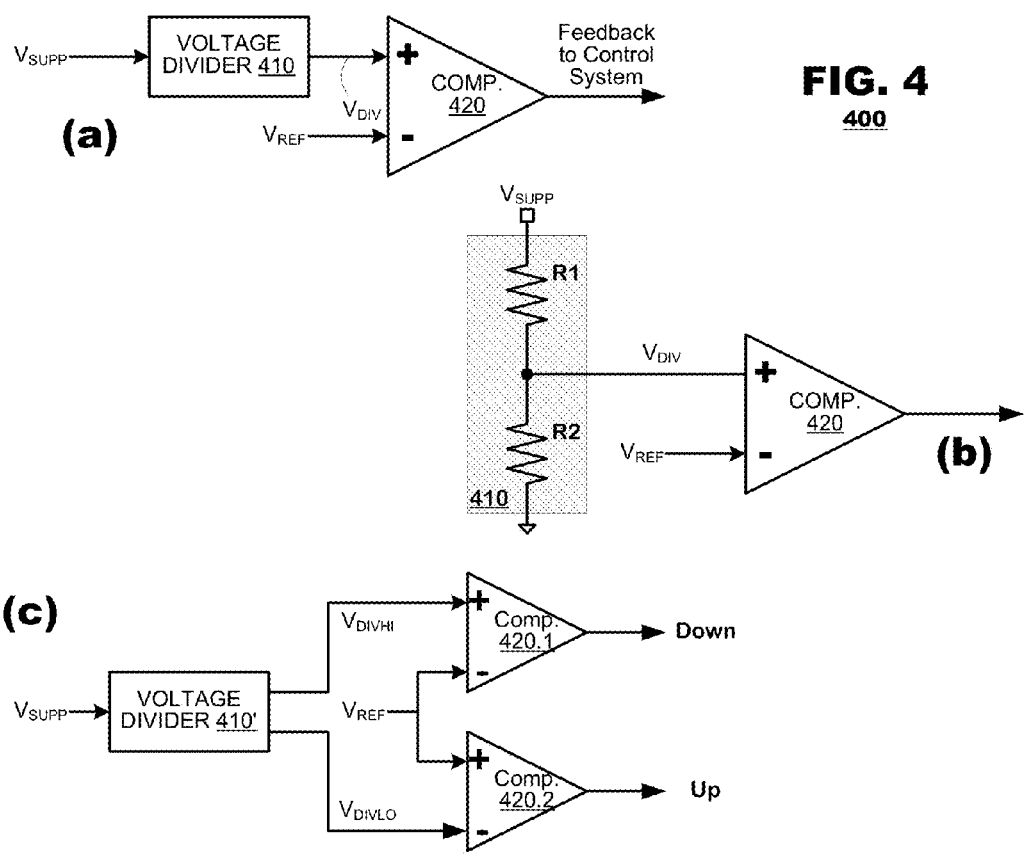
FIG. 4 illustrates supply monitors according to various embodiments of the present invention.

FIG. 4 contains simplified block diagrams of various supply monitors 400 according to an embodiment of the present invention. The supply monitor 400 may find application in the measurement system 170 of FIG. 1. As illustrated in FIG. 4(a), the supply monitor 400 may include a voltage divider 410 and a comparator 420. The voltage divider 410 may have an input coupled to the $V_{SUPP}$ voltage supply. It may divide the input voltage $V_{SUPP}$ by a scaling factor and output a voltage $V_{DIV}$, representing the divided-down voltage. In an embodiment, the voltage divider 410 may be provided as a resistor divider (FIG. 4(b)). The $V_{DIV}$ voltage may be input to a first input terminal of the comparator 420. A reference voltage $V_{REF}$ may be input to a second input terminal of the comparator 420. The reference voltage $V_{REF}$ may be a bandgap reference voltage locally generated at the measurement system 170. The comparator 420 may generate a binary output signal representing a comparison between the $V_{DIV}$ voltage and the $V_{REF}$ voltage. The comparator's output may become a power control signal within the measurement system 170 of FIG. 1.

In another embodiment, shown in FIG. 4(c), the supply monitor 400 may provide a multi-bit output that indicates three states: power should be increased, power should be decreased and power should remain unchanged. In this embodiment, the voltage divider 410' may output a pair of voltages, a high threshold $V_{DIVHI}$ and a low threshold $V_{DIVLO}$, that may be output to respective comparators 420.1, 420.2. The comparators 420.1, 420.2 also may receive the $V_{REF}$ voltage on other inputs, which again may be a bandgap reference voltage. If the $V_{DIVHI}$ voltage exceeds the $V_{REF}$ voltage, the comparator 420.1 may generate an output that indicates a power decrease is warranted. If the $V_{DIVLO}$ voltage is lower than the $V_{REF}$ voltage, the comparator 420.2 may generate an output that indicates a power increase is warranted. If neither comparator 420.1 nor 420.2 generates such outputs, it may indicate no power changed is warranted.

Figure 5:
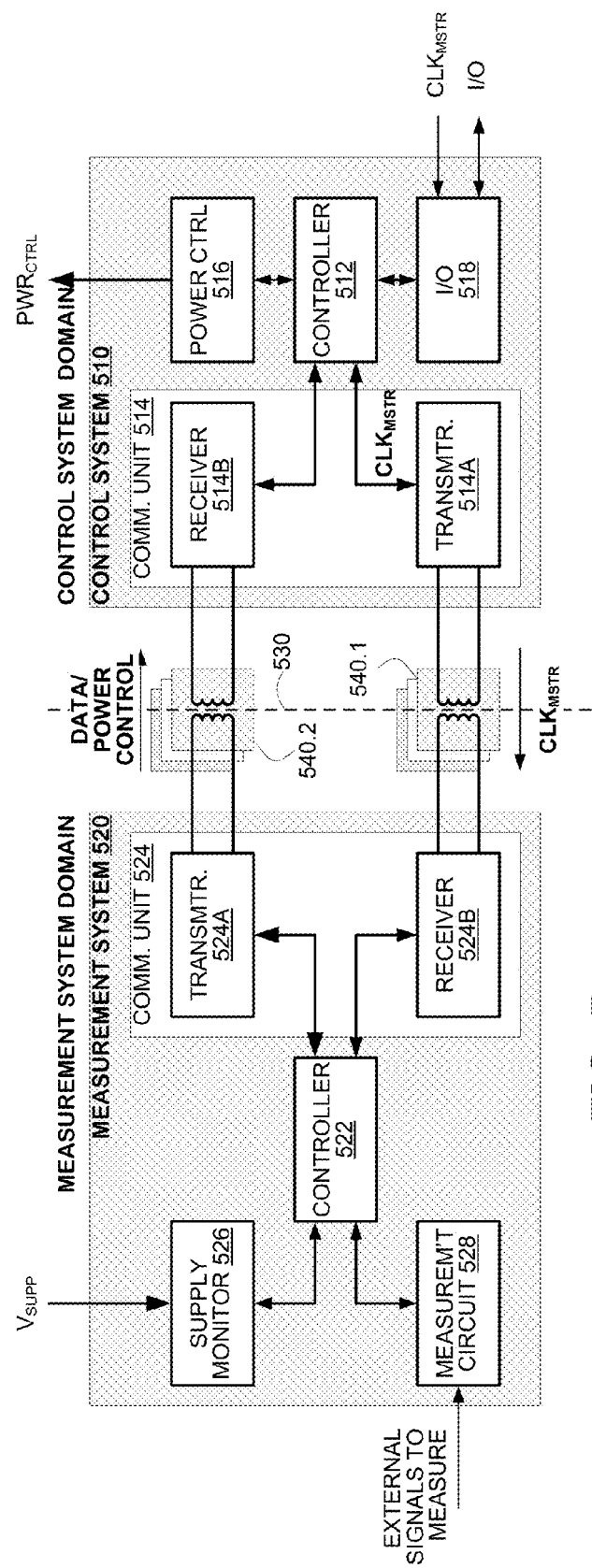
FIG. 5 illustrates a system for communicating timing information and power control data according to another embodiment of the present invention.

FIG. 5 illustrates a system for communicating timing information and power control data within a system 500 according to another embodiment of the present invention. As illustrated, the system 500 may include a control system 510 and a measurement system 520 separated by an isolation barrier 530. In the embodiment illustrated in FIG. 5, the system 500 may include a pair of unidirectional isolators 540.1, 540.2 to communicate the timing and power control signals between the control system 510 and the measurement system 520. In the embodiment of FIG. 5, the system 500 may communicate timing and data from the control system 510 to the measurement system 520 via a first isolator 540.1. The system 500 may communicate power control signals and data from the measurement system 520 to the control system 510 via the second isolator 540.2.

As in the prior embodiments, the control system 510 may include a controller 512, a communication unit 514, a power controller 516 and an I/O unit 518. The communication unit 514 is illustrated as having a transmitter 514A coupled to the first isolator 540.1 and a receiver 514B coupled to the second isolator 540.2. The power controller 516 and I/O unit 518 may operate as in the foregoing embodiments.

Similarly, the measurement system 520 may include a controller 522, a communication unit 524, a supply monitor 526 and measurement circuit(s) 528. The communication unit 524 is illustrated as having a transmitter 524A coupled to the second isolator 540.2 and a receiver 524B coupled to the second isolator 540.1. The supply monitor 526 and measurement circuit(s) 528 may operate as in the foregoing embodiments.

During operation, the controller 512 may generate timing signals corresponding to $CLK_{MSTR}$ events and may output the signals to the transmitter 514A. The transmitter 514A may modulate an isolator transmission signal representing the $CLK_{MSTR}$ signal. In an embodiment, the controller 512 may multiplex the $CLK_{MSTR}$ events with other control data and output a multiplexed signal to the transmitter 514A. Again, the transmitter 514A may modulate the isolator transmission signal representing the multiplexed signal and drive the isolator 540.1 according to the isolator transmission signal.

Within the measurement system 520, the receiver 524B may receive the isolator transmission signals from the first isolator 540.1 and may recover data therefrom. The receiver 524B may output the recovered data to the controller 522. The controller 522 may generate a timing reference for the measurement circuit(s) 528 from timing information present in the recovered data. If the recovered data includes additional control data, the controller 522 may interpret such data and configure its operation in response to it.

Also during operation, the controller 522 within the measurement system domain may receive power control data from the supply monitor 526. The controller 522 also may receive measurement data from the measurement circuits 528. The controller 522 may multiplex the power control data with the measurement data and provide the multiplexed data to a transmitter 524A within the communication unit 524. The transmitter 524A may modulate an isolator transmission signal according to the data provided by the controller 522 and may drive the second isolator 540.2 accordingly.

Within the control system 510, the receiver 514B may receive the isolator transmission signal from the second isolator 540.2 and may recover data therefrom. The receiver 514B may output the recovered data to the controller 512. The controller 512 may parse the recovered data into power control signals and measurement data. The controller 512 may provide the power control signal to the power controller 516 and may provide measurement data to the I/O unit 518.

Figure 6A:
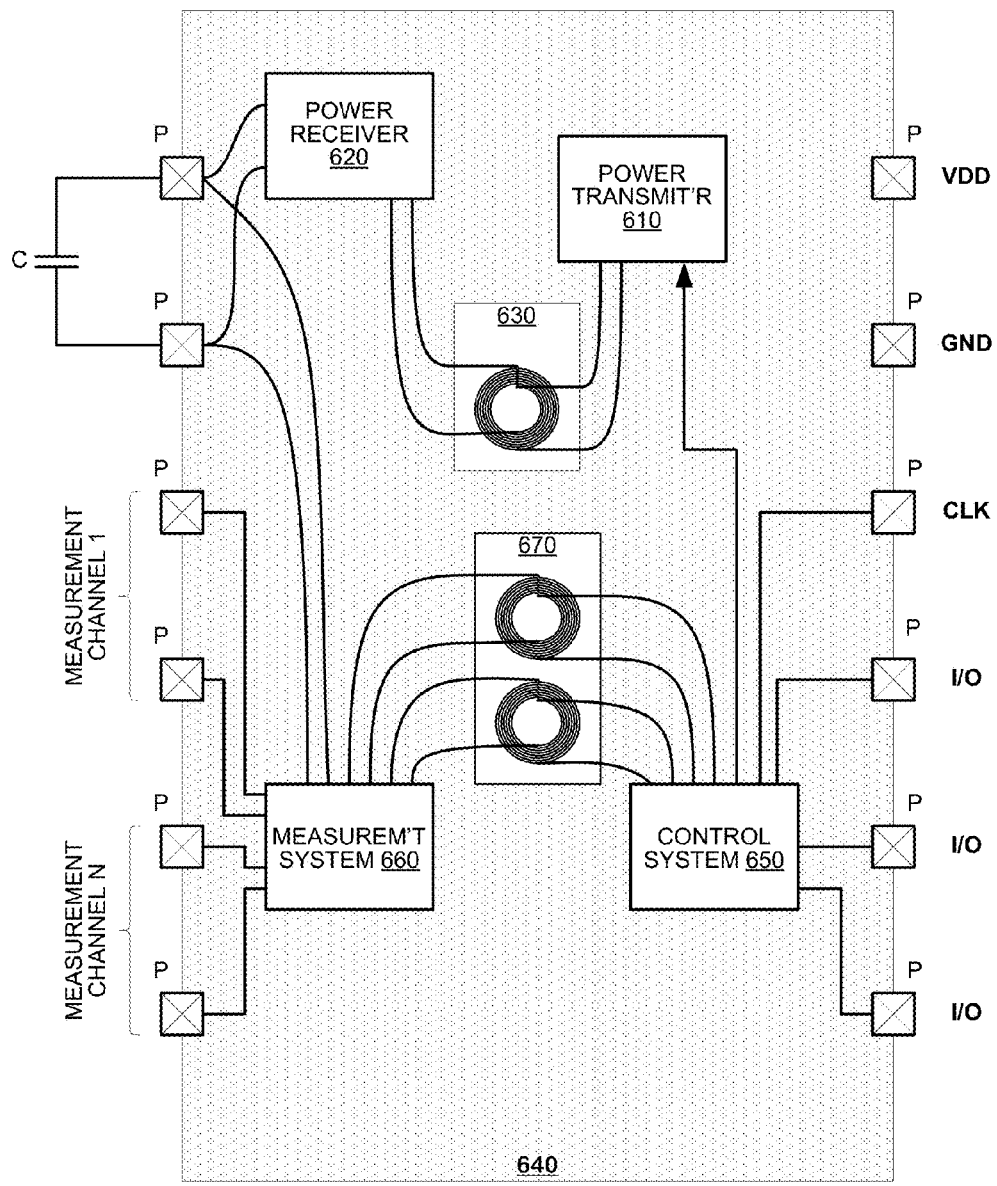
FIG. 6(a) illustrates a power generation system provided in a system-in-package configuration on a non-conductive carrier package substrate according to an embodiment of the present invention.
Figure 6B:
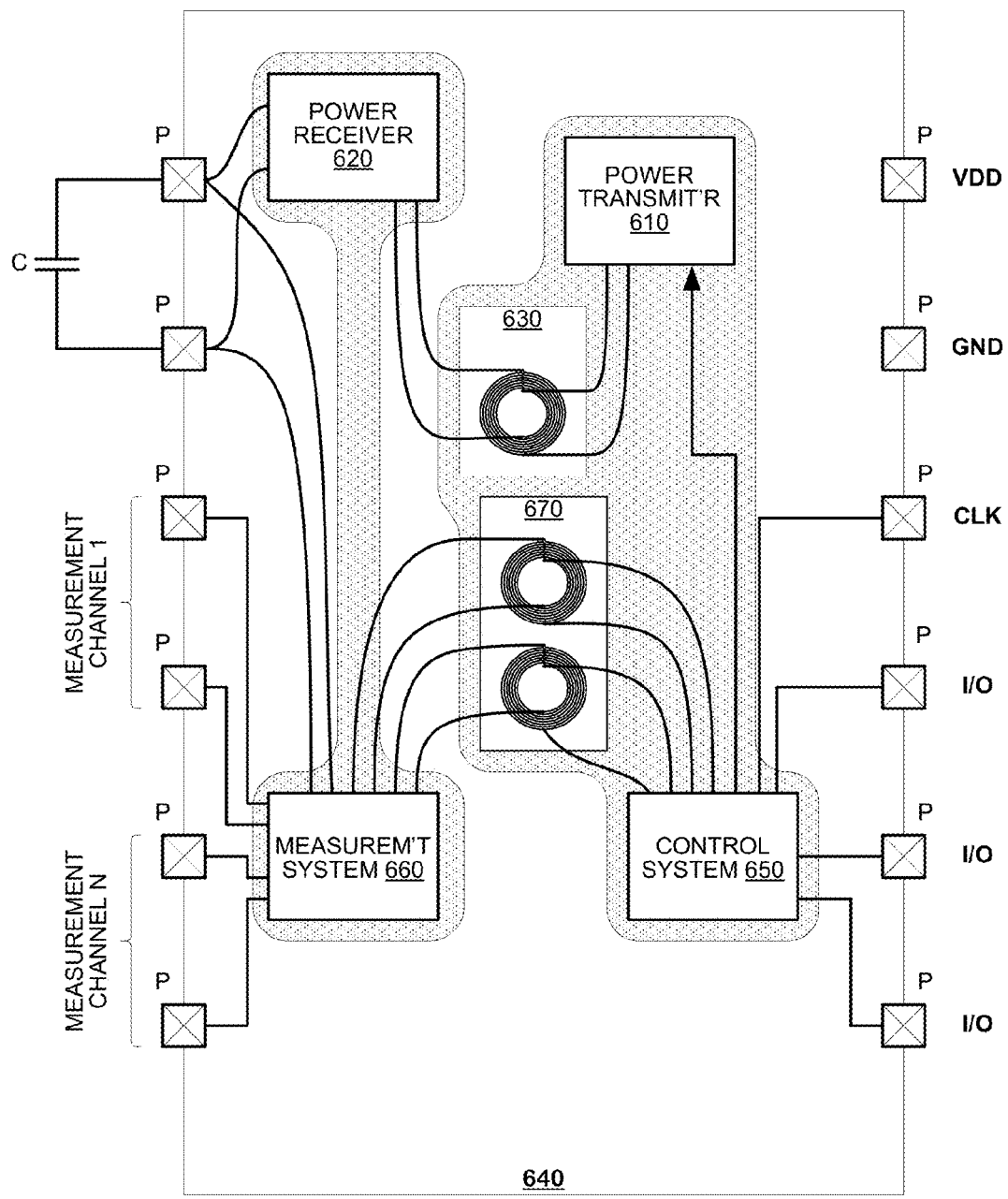
FIG. 6(b) illustrates a power generation system provided in a system-in-package configuration on a conductive split carrier package substrate according to an embodiment of the present invention.

FIG. 6 illustrates a power generation system 600 according to another embodiment of the present invention. FIG. 6 illustrates the power generation system 600 provided in a system-in-package ("SIP") configuration. In this embodiment, the power transmitter 610, power receiver 620 and power isolator 630 may be provided as separate components. The power transmitter 610 and power receiver 620 may be provided on separate semiconductor dies, which may be mounted on a package substrate 640 such as a non-conductive carrier (FIG. 6(a)) or a conductive split carrier (FIG. 6(b)). The power isolator 630 may be provided on the package substrate 640 or, alternatively, may be provided on a separate substrate that may be mounted on the package substrate 640. In the embodiment illustrated in FIG. 6, the power isolator 630 is illustrated as a micro-transformer formed of a pair of spiral conductors (not shown separately) that overlap each other on the substrate 640 and are separated by a dielectric. A first spiral conductor may be coupled to the power transmitter 610 by bridging conductors and a second spiral conductor may be coupled to the power receiver 620 also by bridging conductors. As discussed, the power isolator 630 may be formed as a capacitor network, in which case the power transmitter 610 and power receiver 620 would be coupled to respective capacitor plates by bridging conductors.

FIG. 6 also illustrates the control system 650, the measurement system 660 and the communication isolator(s) 670 provided as separate components. The control system 650 and measurement system 660 may be provided on separate semiconductor dies, which may be mounted on the package substrate 640. The communication isolator(s) 670 may be provided on the package substrate 640 or, alternatively, may be provided on a separate substrate that may be mounted on the package substrate 640. In the embodiment illustrated in FIG. 6, the communication isolators 670 are illustrated as a pair of micro-transformers each formed of a pair of spiral conductors (not shown separately) that overlap each other on the substrate 640 and are separated by a dielectric. A first spiral conductor may be coupled to the control system 650 by bridging conductors and a second spiral conductor may be coupled to the measurement system 660 also by bridging conductors.

As discussed, the communication isolator(s) 670 also may be formed as capacitive or as optical couplers. When provided as a capacitive coupler, the power transmitter 610 and power receiver 620 would be coupled to a respective capacitor plate by bridging conductors. When provided as an optical coupler, transmitters within the control system 650 and the measurement system 660 may be coupled to respective optical transmitters within the optical coupler and receivers within the control system 650 and the measurement system 660 may be coupled to respective optical receivers.

FIG. 6 illustrates an exemplary set of package pins P coupled to respectively components of the system 600. A pair of pins may be provided to couple the power receiver 620 to a discrete capacitor. Other pins may be provided for I/O communication and an external clock CLK, which may be coupled to the control system 650. Still other sets of pins may be provided for coupling test subjects to the measurement system 660. In the example of FIG. 6, two pairs of pins are provided for two test subjects (represented as "measurement channels" of the system 600). The package also may have pins for connection to supply voltages, for example, $V_{DD}$ and ground supplies for the control system 650 and power transmitter 610.

In a further embodiment, the power transmitter 610 and control system 650 may be provided in a first package and the power receiver 620 and the measurement system 660 may be provided in a second package. The isolators 630, 670 may be provided in their own, third package or, alternatively, may be provided in one of the first or second packages.

Several embodiments of the invention are specifically illustrated and/or described herein. However, it will be appreciated that modifications and variations of the invention are covered by the above teachings and within the purview of the appended claims without departing from the spirit and intended scope of the invention.

I claim:

1. A system for performing isolated measurement, comprising:
   a power transmitter provided on a first side of an isolation barrier,
   a power receiver provided on a second side of the isolation barrier,
   a first isolator coupling the power transmitter to the power receiver, and
   a control system, provided in the first side, to provide a clock signal defining timing of a predetermined input sampling operation of a measurement system in the second side and to generate a disabling signal to the power transmitter synchronously with the timing of the predetermined input sampling operation,
   a second isolator for transmission of data between the first side and the second side,
   wherein the power transmitter is disabled from transmitting power for the timing of the predetermined input sampling operation based on the disabling signal.

2. The system of claim 1, wherein
   the second side to receive the clock signal from the first side and produce an isolated clock signal for the measurement system provided on the second side.

3. The system of claim 2, wherein the measurement system comprises an analog to digital converter.

4. The system of claim 3, wherein the measurement system comprises a sigma delta analog to digital converter.

5. The system of claim 3, wherein the measurement system comprises a multi-bit analog to digital converter.

6. The system of claim 2, wherein the control system and power transmitter are provided in a package separate from a package in which the power receiver and measurement system are provided.

7. The system of claim 2, wherein the control system, power transmitter, power receiver and measurement system are provided in a common package.

8. The system of claim 2, further comprising a monitor provided in the second side to measure at least one of a voltage and current to obtain an indication of power received by the power receiver.

9. The system of claim 1, further comprising a power control system, provided in the first side, to modulate the disabling signal according to power feedback signals received from the second side.

10. The system of claim 9, wherein the disabling signal has an activation period that varies from a minimum duration to a maximum duration according to the power feedback signals.

11. The system of claim 9, wherein the disabling signal has an activation period that toggles between a minimum duration and a maximum duration according to the power feedback signals.

12. The system of claim 1, wherein the predetermined input sampling operation is sampling an input voltage by the measurement system.

13. The system of claim 1, wherein the predetermined input sampling operation is settling of voltages stored on or removed from capacitors within an analog to digital converter of the measurement system.

14. The system of claim 1, wherein the predetermined input sampling operation is comparison operations of a comparator within an analog to digital converter of the measurement system.

15. A method of controlling an isolated measurement system, comprising:
   delivering power via a first isolator from the first side of an isolation barrier to a second side of an isolation barrier by an isolator driving signal,
   generating, on a first side of the isolation barrier, a clock signal defining timing of a predetermined input sampling operation of a measurement system on a second side of the isolation barrier,
   transmitting the clock signal to the second side via a second isolator,
   receiving measurement data from the second side, wherein the measurement data is not received via the first isolator, and
   disabling the isolator driving signal synchronously with the predetermined input sampling operation.

16. The method of claim 15, wherein the predetermined input sampling operation is a sampling of a voltage at an input of the measurement system.

17. The method of claim 15, wherein the predetermined input sampling operation is a sampling of a voltage by an analog-to-digital converter of the measurement system.

18. The method of claim 17, wherein the isolator driving signal resumes during a conversion operation of the analog-to-digital converter.

19. The method of claim 15, wherein the predetermined input sampling operation is sampling an input voltage by the measurement system.

20. The method of claim 15, wherein the predetermined input sampling operation is settling of voltages stored on or removed from capacitors within an analog to digital converter of the measurement system.

21. The method of claim 15, wherein the predetermined input sampling operation is comparison operations of a comparator within an analog to digital converter of the measurement system.

22. The method of claim 15, further comprising:
   measuring at least one of a voltage and current to obtain an indication of power received at the second side based on the power delivery, and generating a power control signal representing the measured power, and transmitting data representing the power control signal from the second side to the first side.

23. The method of claim 22, wherein the power control signal is transmitted synchronously with the clock signal.

24. The method of claim 22, wherein the power control signal is multiplexed with measurement data of the measurement system prior to transmission.

25. The method of claim 22, further comprising varying, in response to the power control signals, a duration of times at which the isolator driving signal is disabled.

26. A system, comprising:
a power transmitter provided on a first side of an isolation barrier,
a power receiver provided on a second side of the isolation barrier,
a measurement system provided on the second side of the isolation barrier to generate measurement data,
a power monitor provided on the second side of the isolation barrier to measure power received by the power receiver and to generate power measurement signals;
a first isolator coupling the power transmitter to the power receiver,
a second isolator to carry the power measurement signals from the second side to the first side,
and a power controller to modulate a control signal to the power transmitter, the control signal defining a duty cycle of activation of the power transmitter, wherein the control signal deactivates the power transmitter at times when the measurement system performs input sampling operations.

27. The system of claim 26, further comprising a clock generator in the first side, an output of the clock generator defining timing of the input sampling operations of the measurement system.

28. The system of claim 26, wherein the power measurement signals are merged with the measurement data from the measurement system and transmitted across the second isolator.

29. The system of claim 26, wherein the power controller generates a pulse width modulated control signal to the power transmitter.

30. The system of claim 26, wherein the power controller generates a control signal to the power transmitter whose pulse duration toggles between a first and second duration.

31. A system for controlling isolated measurements, comprising:
a power transmitter provided on a first side of an isolation barrier, having an output coupled to a first isolator, to provide power to a second side of the isolation barrier,
a control system provided on the first side having:
a first output, coupled to a second isolator, for a clock signal defining timing of a predetermined input sampling operation of a measurement system on the second side of the isolation barrier, and
a second output, coupled to the power transmitter, for a disabling signal that disables the power transmitter synchronously with the timing of the predetermined input sampling operation.

* * * * *